(12) United States Patent
Yoon et al.

(10) Patent No.: US 11,137,064 B2
(45) Date of Patent: Oct. 5, 2021

(54) METHOD OF MANUFACTURING DOUBLE LAYER TYPE TRANSMISSION PLANETARY GEAR CARRIER AND PLANETARY GEAR CARRIER MANUFACTURED BY THE SAME

(71) Applicants: HYUNDAI MOTOR COMPANY, Seoul (KR); KIA MOTORS CORPORATION, Seoul (KR)

(72) Inventors: Hyung-Sop Yoon, Yongin-si (KR); Young-Ji Park, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 14 days.

(21) Appl. No.: 16/687,052

(22) Filed: Nov. 18, 2019

(65) Prior Publication Data
US 2020/0232553 A1 Jul. 23, 2020

(30) Foreign Application Priority Data

Jan. 17, 2019 (KR) ........................ 10-2019-0006408

(51) Int. Cl.
*F16H 57/08* (2006.01)
*B21K 1/30* (2006.01)
(Continued)

(52) U.S. Cl.
CPC ............. *F16H 57/082* (2013.01); *B21K 1/30* (2013.01); *B21K 25/00* (2013.01); *F16H 2001/325* (2013.01); *F16H 2057/087* (2013.01)

(58) Field of Classification Search
CPC ............. F16H 57/082; F16H 2057/087; F16H 2001/325; B21K 1/30; B21K 25/00;
(Continued)

(56) References Cited

U.S. PATENT DOCUMENTS

2004/0077455 A1* 4/2004 Huber .................. F16H 57/082
475/331
2008/0250839 A1* 10/2008 Nakajima .............. B21K 1/762
72/356

(Continued)

FOREIGN PATENT DOCUMENTS

KR 2012-0030077 A 3/2012

*Primary Examiner* — Justin Holmes
(74) *Attorney, Agent, or Firm* — McDonnell Boehnen Hulbert & Berghoff LLP

(57) ABSTRACT

The present disclosure relates to a method of manufacturing a double layer type transmission planetary gear carrier and a planetary gear carrier manufactured by the same, and more particularly, to a material of the carrier and a method of combining materials. The present manufacturing method includes: forming and processing a carrier plate and a base plate by performing hot forging on two aluminum alloys; and welding a connecting portion between the two plates. The present double layer carrier may include a carrier plate; and a base plate which is welded on a connecting portion of the carrier plate, in which materials of the two plates are aluminum forging alloys. According to the present disclosure, it is possible to reduce a weight of the double layer type planetary gear carrier by about 60% by applying an aluminum material and it is possible to easily manufacture the double layer type planetary gear carrier.

10 Claims, 17 Drawing Sheets

(51) Int. Cl.
*B21K 25/00* (2006.01)
*F16H 1/32* (2006.01)

(58) Field of Classification Search
CPC .............. B23K 26/24; B23K 2101/008; B23K 2103/10; B23K 2103/18; B23K 26/21; B23K 26/702
See application file for complete search history.

(56) References Cited

U.S. PATENT DOCUMENTS

| | | | | |
|---|---|---|---|---|
| 2015/0071815 | A1* | 3/2015 | Wiesner | C22C 21/04 |
| | | | | 420/532 |
| 2015/0144227 | A1* | 5/2015 | Kang | F02F 3/0084 |
| | | | | 148/417 |
| 2015/0315688 | A1* | 11/2015 | Doty | C22C 21/16 |
| | | | | 420/532 |
| 2019/0300988 | A1* | 10/2019 | Wang | C22C 21/02 |

* cited by examiner (a)

METHOD OF MANUFACTURING DOUBLE LAYER TYPE TRANSMISSION PLANETARY GEAR CARRIER AND PLANETARY GEAR CARRIER MANUFACTURED BY THE SAME

CROSS REFERENCE TO RELATED APPLICATION

This application claims priority under 35 U.S.C. § 119 to Korean Patent Application No. 10-2019-0006408, filed on Jan. 17, 2019, in the Korean Intellectual Property Office, the disclosure of which is incorporated herein by reference in its entirety.

BACKGROUND

(a) Field

The present disclosure relates to a method of manufacturing a double layer type transmission planetary gear carrier and a planetary gear carrier manufactured by the same, and more particularly, to a method of combining plates and materials of the plates.

(b) Description of the Related Art

A transmission planetary gear carrier refers to a structure to which a planetary gear set for changing a gear ratio of an automatic transmission is fixed. Pinion gears, which constitute the planetary gear set, engage with a sun gear and an annulus gear to make various gear ratios, while the transmission planetary gear carrier supports a load caused by transmission of driving power between the corresponding gears and supplies lubricating oil to rotating parts.

There are two types of transmission planetary gear carriers which are structurally distinguishable. The two types of transmission planetary gear carriers include a single layer type planetary gear carrier (see FIG. 1A) on which a set of pinion gears having the same length is mounted, and a double layer type planetary gear carrier (see FIG. 1B) on which a set of pinion gears having different lengths, that is, a set of a long pinion gear and a short pinion gear is mounted.

The double layer type planetary gear carrier receives great and complex loads from the two pinion gears having different lengths. However, the planetary gear carrier is not designed to sufficiently support the corresponding loads, and a heavy weight of the carrier is relatively advantageous in supporting the corresponding loads. As a result, reducing a weight of the carrier by changing a material of the carrier to aluminum is very disadvantageous.

Therefore, the reducing of the weight of the carrier by applying an aluminum material has been inevitably applied only to the single layer type carrier, and a material made by die casting is applied in all cases. A die casting process method is suitably applied to the single layer type carrier because four or five slide cores are provided in a direction perpendicular to a shaft and thus a mold is easily implemented, and a structure of the carrier is also comparatively simple. However, it is impossible to implement four to five slides by binding two layers because of the structure of the double layer type carrier, and it is impossible to ensure quality because it is difficult to supply molten metal through a runner due to a position of an intermediate plate for fixing the short pinion gear.

SUMMARY

The present disclosure has been made in an effort to reduce a weight of a double layer type planetary gear carrier by applying an aluminum material.

The present disclosure has also been made in an effort to easily manufacture a planetary gear carrier made of an aluminum material.

An exemplary embodiment of the present disclosure provides a method of manufacturing a double layer type transmission planetary gear carrier, the method including: forming and processing a carrier plate and a base plate by performing hot forging on two aluminum alloys; and welding a connecting portion between the two plates.

The connecting portion between the two plates may be welded by laser welding.

At least one of the two aluminum alloys may include silicon (Si) of 10.5 to 13.5 wt %. The aluminum alloy including silicon (Si) of 10.5 to 13.5 wt % may further include copper (Cu) of 3.0 to 5.0 wt % and magnesium (Mg) of 0.2 to 1.0 wt %.

The method may further include performing a T7 heat treatment on the two plates before welding the two plates.

Another exemplary embodiment of the present disclosure provides a double layer type transmission planetary gear carrier including: a carrier plate; and a base plate which is welded on a connecting portion of the carrier plate, in which materials of the two plates are aluminum forging alloys.

At least one of the two plates may include silicon (Si) of 10.5 to 13.5 wt %.

The plate including silicon (Si) of 10.5 to 13.5 wt % may include primary silicon and eutectic silicon.

The plate including silicon (Si) of 10.5 to 13.5 wt % may further include copper (Cu) of 3.0 to 5.0 wt % and magnesium (Mg) of 0.2 to 1.0 wt %.

Fatigue strength of the plate may be 99 to 129 MPa.

Elongation of the plate may be 1.7 to 2.4%.

Breaking strength of the connecting portion may be 65% or more of breaking strength of the plate.

According to the present disclosure, it is possible to reduce a weight of the double layer type planetary gear carrier by about 60% by applying an aluminum material to the double layer type planetary gear carrier.

According to the present disclosure, it is possible to easily manufacture the planetary gear carrier made of an aluminum material.

BRIEF DESCRIPTION OF THE FIGURES

FIGS. 13A and 13B are CT photographs of a bubble defect at a welding site, in which FIG. 13B is a CT photograph of a side cross section of the carrier.

DETAILED DESCRIPTION

Hereinafter, the present disclosure will be described in detail. However, the present disclosure is not restricted or limited by exemplary embodiments. An object and an effect of the present disclosure may be naturally understood or may become clearer from the following description, and the object and the effect of the present disclosure are not restricted only by the following description. In addition, in the description of the present disclosure, the specific descriptions of publicly known technologies related with the present disclosure will be omitted when it is determined that the specific descriptions may unnecessarily obscure the subject matter of the present disclosure.

Figure 1A:
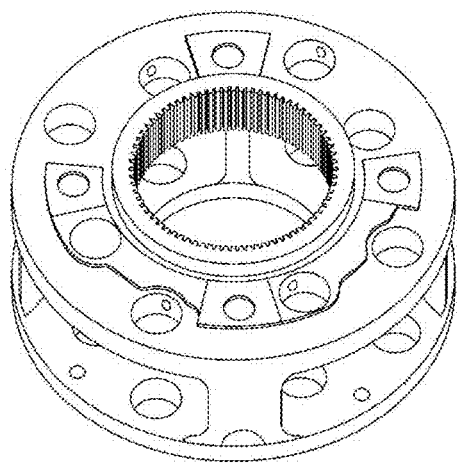
FIG. 1A is a view illustrating a single layer type transmission planetary gear carrier.
Figure 1B:
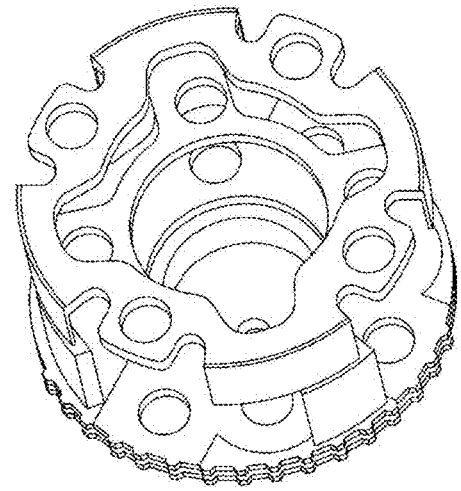
FIG. 1B is a view illustrating a double layer type transmission planetary gear carrier.
Figure 2:
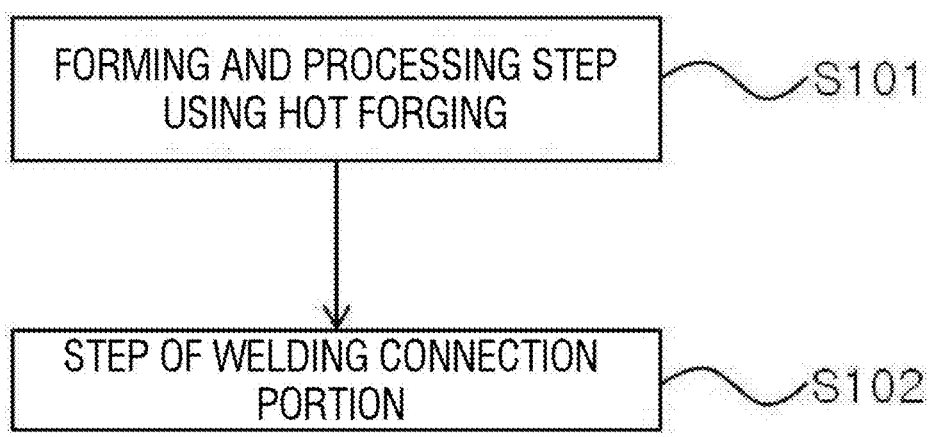
FIG. 2 is a flowchart of a method of manufacturing a double layer type transmission planetary gear carrier according to the present disclosure.
Figure 3A:
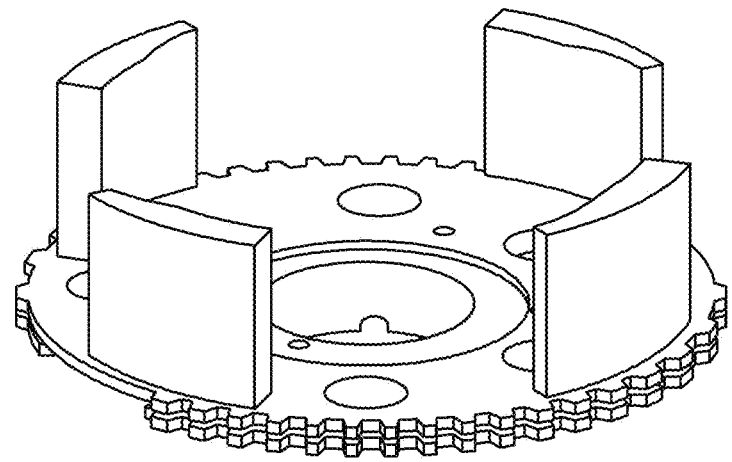
FIG. 3A is a view illustrating a carrier plate.
Figure 3B:
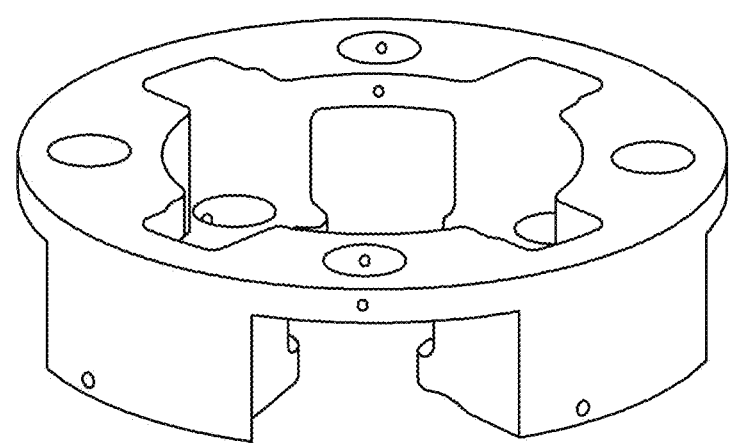
FIG. 3B is a view illustrating a base plate.
Figure 3C:
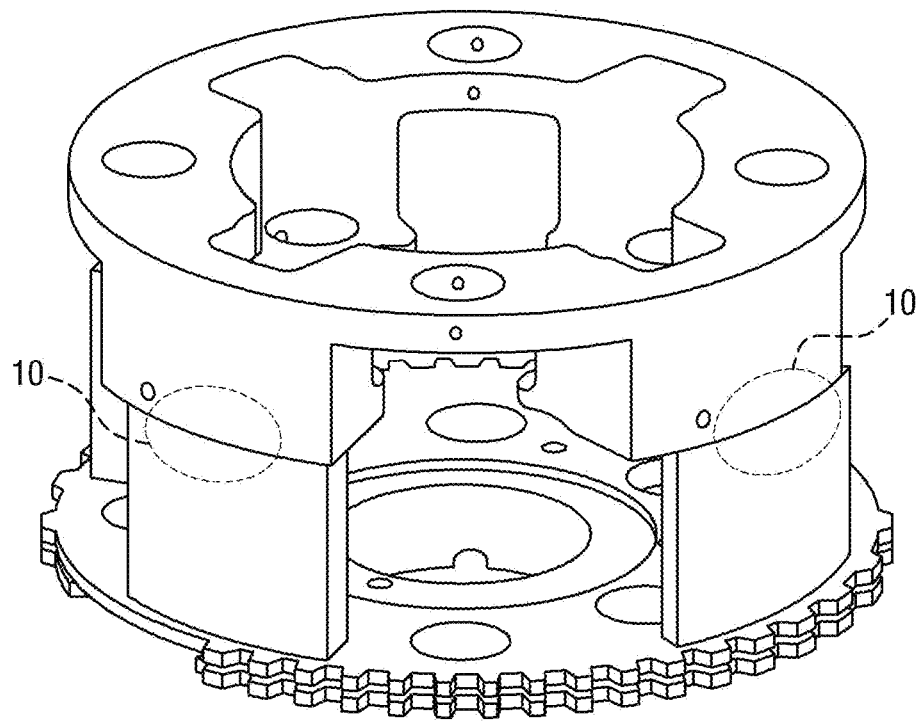
FIG. 3C is a view illustrating a carrier made by welding the two plates.

FIG. 2 is a flowchart of a method of manufacturing a double layer type transmission planetary gear carrier according to the present disclosure. FIG. 3A is a view illustrating a carrier plate, FIG. 3B is a view illustrating a base plate, and FIG. 3C is a view illustrating a carrier made by welding the two plates. Hereinafter, a 'double layer type transmission planetary gear carrier' is referred to as a 'double layer carrier'.

Referring to FIGS. 2 and 3, the present disclosure includes a step S101 of forming and processing a carrier plate and a base plate by performing hot forging on two aluminum alloys, and a step S102 of welding a connecting portion 10 between the two plates.

The carrier plate and the base plate may not be formed as one piece in a case in which the double layer carrier is manufactured by using aluminum alloys. A die casting method and a gravity casting method may be considered as methods capable of forming the carrier plate and the base plate as one piece, but each of these methods causes the following problems.

In the case of the die casting method, slide molds, of which the minimum number is four and the maximum number is eight, need to be used, and as a result, a mold structure is complicated and thus it is difficult to ensure internal quality. Among other things, it is very difficult to ensure durability due to a severe restriction of a shape caused by a draft at each site. In the case of the gravity casting method, the above-mentioned problem may be solved by using a sand mold core, but it is disadvantageous in reducing a weight because of an increase in thickness. In addition, it is disadvantageous in terms of costs because a heat treatment step needs to be additionally performed.

Therefore, to ensure durability and achieve a reduction in weight, the carrier plate and the base plate may be separately manufactured and then welded, and more specifically, the plates may be manufactured by performing hot forging on the two aluminum alloys and then the connecting portion between the two plates may be welded. To ensure durability, the welding site may be set to a portion where a welding bead is narrow and a welding depth is deep, and the connecting portion between the two plates may be suitable as a welding site when considering the structure of the double layer carrier.

The connecting portion between the two plates may be welded by laser welding.

It is necessary to minimize thermal deformation caused by welding and a change in physical properties of the welding site. The laser welding may be performed under a welding condition because a width of the welding bead is 2 mm or less and a height of the welding bead is 0.3 mm or less. Therefore, portions, which are affected by heat during laser welding, may be minimized to be two or less times the bead width.

The welding depth changes from 4 mm at least to 9 mm at most within a section in which the welding length is about 40 mm. In consideration of a direction of a load when the carrier rotates, the welding may be performed while a laser output is increased from a site having a minimum thickness to a site having a maximum thickness.

At least one of the two aluminum alloys may include silicon (Si) of 10.5 to 13.5 wt %. Here, at least one alloy means one selected from or both of the aluminum alloy used to manufacture the carrier plate and the aluminum alloy used to manufacture the base plate.

A hot crack may occur at the welding site during laser welding. The aluminum alloy may include silicon (Si) of 4 wt % or more to prevent the occurrence of the hot crack. Meanwhile, a silicon (Si) content of the aluminum alloy may particularly be 10.5 wt % or more because wear resistance of the double layer carrier may be improved when the aluminum alloy includes silicon (Si) of 10.5 wt % or more.

The wear resistance is improved as the silicon (Si) of 10.5 wt % or more included in the aluminum alloy becomes the eutectic silicon and the primary silicon. A eutectic point in an aluminum-silicone binary state has been known as about 12.7 wt %, but in an alloy state, the primary silicon may be created even though the silicon content is lower than about 12.7 wt %.

Figure 4:
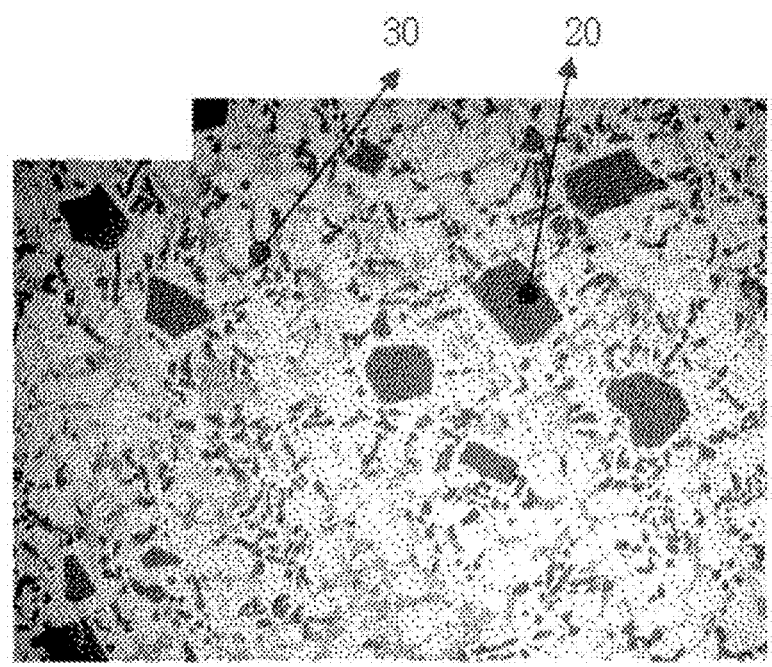
FIG. 4 is a view illustrating eutectic silicon and primary silicon according to an exemplary embodiment of the present disclosure.

FIG. 4 is a view illustrating eutectic silicon and primary silicon according to an exemplary embodiment of the present disclosure. Referring to FIG. 4, when the silicon (Si) content is maintained to be at least 10.5 wt % or more, tissue of some pieces of primary silicon 20 and tissue of multiple pieces of eutectic silicon 30 are formed, such that wear resistance is increased. This is because if wear-resistant particles are small but strength of a substrate is high, withdrawal of silicon (Si) particles is prevented, and thus wear resistance is maintained.

Meanwhile, if the silicon (Si) content of the aluminum alloy exceeds 13.5 wt %, multiple pieces of coarse primary silicon may be produced when manufacturing billets by using continuous casting, and the coarse primary silicon makes it difficult to perform forming processing during a subsequent forging process and degrades physical properties of a final product. Therefore, the aluminum alloy may include silicon (Si) of 13.5 wt % or less.

A washer is applied to prevent wear of contact surfaces of the double layer carrier and gears. Because the aluminum carrier has a lower wear resistance than a general steel carrier, there have been proposed methods of changing a material of the washer from steel to copper or increasing the number of washers. However, the washer may be used as it is without changing the material and the number of washers when the plate is manufactured by using the aluminum alloy including silicon (Si) of 10.5 to 13.5 wt %.

Meanwhile, in a case in which the two plates are manufactured by using the aluminum alloy including silicon (Si) of 10.5 to 13.5 wt % and then welded as described below, there is also an advantage in that it is possible to prevent the occurrence of the hot crack without using filler materials.

Hereinafter, the 'aluminum alloy including silicon (Si) of 10.5 to 13.5 wt %' is referred to as the 'present aluminum alloy' or the 'present alloy'.

TABLE 1

| Classification | Cu | Mg | Si | Ni | Al |
|---|---|---|---|---|---|
| 6082 MF | 0.2 to 0.4 | 0.6 to 1.2 | 0.7 to 1.3 | — | Rem. |
| Present Alloy | 3.0 to 5.0 | 0.2 to 1.0 | 10.5 to 13.5 | — | Rem. |
| Comparative Example | 0.5 to 1.3 | 0.8 to 1.3 | 11.0 to 13.5 | 0.5 to 1.3 | Rem. |

TABLE 2

| Classification | | Present Alloy | Comparative Example |
|---|---|---|---|
| Hardness (HrB) | RT | 76.2 | 74.1 |
| | 100° C. | 74.9 | 72.7 |
| | 150° C. | 74.6 | 71.7 |
| Yield Strength (MPa) | | 414.98 | 355.54 |
| Tensile Strength (MPa) | | 453.84 | 399.17 |
| Elongation (%) | | 1.66 | 1.651 |
| Impact Value (J/cm$^2$) | | 1.22 | 1.14 |

Table 1 shows organized data of 6082 MF, which is an aluminum forging alloy, the present aluminum alloy, and a composition range of copper (Cu), magnesium (Mg), silicon (Si), nickel (Ni), and aluminum (Al) of an aluminum alloy according to a Comparative Example. Table 1 shows the composition range of the five elements, but the present aluminum alloy may include iron (Fe) of 0.5 wt % or less, manganese (Mn) of 0.1 wt % or less, zinc (Zn) of 0.1 wt % or less, titanium (Ti) of 0.25 wt % or less, and chromium (Cr) of 0.1 wt % or less.

Referring to Table 1, the present aluminum alloy includes a larger amount of copper (Cu) and silicon (Si) than the aluminum forging alloy 6082 MF, the present alloy includes a larger amount of copper Cu than the alloy according to a comparative example, but the present alloy does not include nickel (Ni) included in the comparative example.

Copper (Cu) and magnesium (Mg) in the present alloy serve to improve physical properties of the aluminum alloy through precipitation phases of $Al_2Cu$ and $Mg_2Si$ by improving strength by a heat treatment, fixing silicon (Si) particles, and improving a performance. The composition range of copper (Cu) and magnesium (Mg) of the present alloy is a composition range suitable to maximizing the improvement of strength by maximally forming a supersaturated solid solution and inducing a fine coherent precipitation phase during rapid cooling.

Table 2 shows organized comparisons between the present alloy and the alloy according to the comparative example in terms of hardness, yield strength, tensile strength, elongation, and impact values. The hardness was measured at room temperature (RT), 100° C., and 150° C. Referring to Table 2, it can be seen that the physical properties of the present alloy are better than the physical properties of the alloy according to the comparative example. A main reinforcing phase of the alloy according to the comparative example is magnesium (Mg) and nickel (Ni), while a main reinforcing phase of the present alloy is copper (Cu) and magnesium (Mg), and as a result, there is a difference in physical properties.

Figure 5:
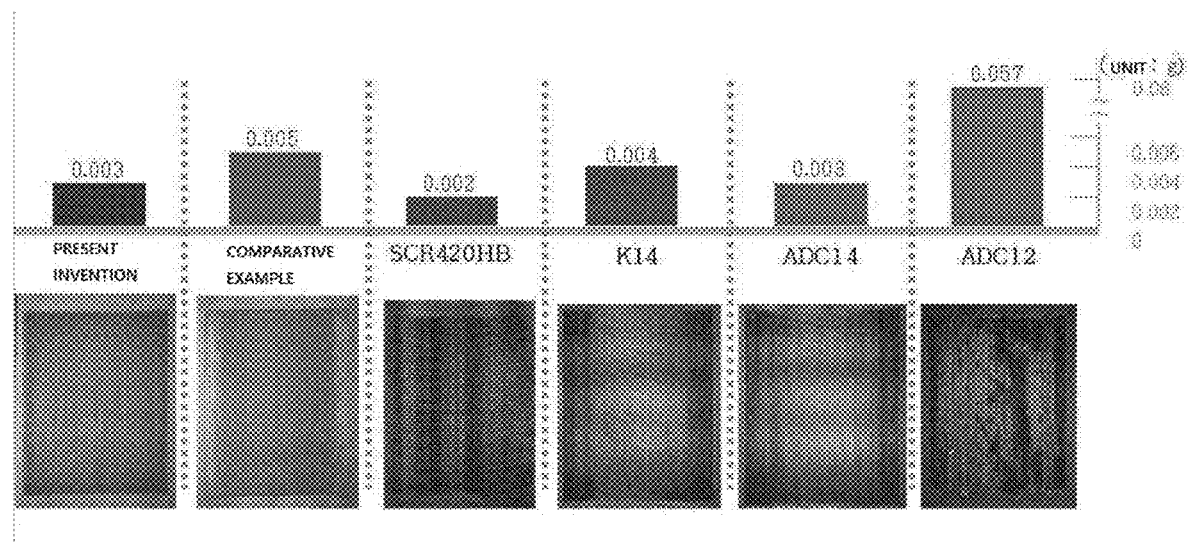
FIG. 5 is a graph illustrating an organized result of evaluating reciprocating friction that may be used to evaluate wear resistance and compare wear resistance based on the amount of change in weight.

FIG. 5 is a graph illustrating an organized result of evaluating reciprocating friction used to evaluate wear resistance and compares wear resistance based on the amount of change in weight. The objects, on which evaluation and comparison regarding wear resistance are to be performed, are the present alloy, the alloy according to the comparative example, SCR420HB which is mass-produced at present, K14 and ADC14 which are wear-resistant hypereutectic alloys made of 4000 series materials, and ADC12 which is a die casting material.

Referring to FIG. 5, it can be seen that wear resistance of the present alloy is improved by about 10 times or more in comparison with the die casting material in the related art. The composition range of copper (Cu) and magnesium (Mg) of the alloy according to the comparative example is different from that of the present alloy as described above, but the composition ranges of silicon (Si) of the present alloy and the alloy according to the comparative example overlap each other when the silicon content is 11.0 to 13.5 wt %, and silicon (Si) is an element added to improve wear resistance, and as a result, a result of evaluating wear resistance of the alloy according to the comparative example may be considered as a result of evaluating wear resistance of the present alloy. It can be seen that the wear resistance of the present alloy is at a level equal to a level of the wear resistance of the wear-resistant hypereutectic alloy made of 4000 series materials. Therefore, it can be seen that the present alloy is suitable as a material for the double layer carrier because the present alloy exhibits excellent wear resistance against friction with the gear.

The method of manufacturing a double layer carrier according to the present disclosure may further include performing a T7 heat treatment on the two plates before welding the two plates. The T7 heat treatment step is performed to compensate for brittleness of the aluminum material including a large amount of silicon (Si). The T7 heat treatment step is a stabilization heat treatment that may ensure durability required for the carrier by reducing residual stress of a forging material, inhibiting a change in dimension after an operation, and improving elongation and fatigue strength of the welding site.

TABLE 3

| Alloy and Heat Treatment | Items | Fatigue Strength (MPa) | Impact Value (J/cm$^2$) | Yield Strength (MPa) | Tensile Strength (MPa) | Elongation (%) | Hardness (HrB) |
|---|---|---|---|---|---|---|---|
| Present alloy - T6 | Average | 108 | 1.22 | 415.0 | 453.8 | 1.6 | 76.2 |
| Present alloy - T7 (1) | Average | 99 | 1.33 | 330.3 | 374.2 | 1.7 | 72.1 |
| | Deviation | | | 8.0 | 8.7 | 0.5 | 0.95 |
| Present alloy - T7 (2) | Average | 129 | 1.96 | 291.0 | 356.9 | 2.4 | 70.9 |
| | Deviation | | | 15.1 | 6.9 | 0.6 | 1.19 |
| 6082 MF - T6 | Average | 96.5 | — | 233.5 | 345.0 | 16.8 | 41.9 |
| | Deviation | | | 6.6 | 1.8 | 1.5 | 1.48 |

Table 3 shows organized mechanical and physical properties when a T6 heat treatment is performed on the present alloy (hereinafter, referred to as an 'A material'), when a T7 (1) heat treatment is performed on the present alloy (hereinafter, referred to as a 'B material'), when a T7 (2) heat treatment is performed on the present alloy (hereinafter, referred to as a 'C material'), and when the T6 heat treatment is performed on the aluminum forging alloy 6082 MF (hereinafter, referred to as a 'D material'). Here, the T7 (1) and T7 (2) heat treatments refer to the T7 heat treatment but mean that heat treatment conditions are changed. More specifically, the T7 (1) heat treatment means that the heat treatment is performed at 480° C. for 4 hours, and then the heat treatment is performed at 180° C. for 16 hours. The T7 (2) heat treatment means that the heat treatment is performed at 480° C. for 4 hours, and then the heat treatment is performed at 195° C. for 8 hours. The number of cycles for the two cases is 5.0E+8.

Referring to Table 3, it can be seen that the B material has lower strength than the A material but has higher elongation than the A material, the C material has higher fatigue strength than the A material, the elongation of the C material is increased by 50%, and the B and C materials are better in strength than the D material. Therefore, it can be seen that the T7 heat treatment step is a heat treatment capable of ensuring durability against intermittent loads applied from the gears.

TABLE 4

| Material | Breaking Strength (%, Comparison with Base Material) | Breaking Elongation |
|---|---|---|
| A + A | 266.3 MPa (66.0%) | 1.09 |
| B + C | 242.8 MPa (68.0%) | 1.56 |
| C + D | 221.5 MPa (64.2%) | 1.49 |
| D + D | 121.3 MPa (47.2%) | 0.68 |

Table 4 shows measurements of breaking strength and breaking elongation when combinations of the A to D materials are variously set, and it is possible to evaluate deterioration in strength at a welding site for each material. The objects to be evaluated are a material made by combining the A materials (hereinafter, referred to as an 'A+A material'), a material made by combining the B and C materials (hereinafter, referred to as a 'B+C material'), a material made by combining the C and D materials (hereinafter, referred to as a 'C+D material'), and a material made by combining the D materials (hereinafter, referred to as a 'D+D material'). A reference welding area is 70 to 80% of an actual welding area, and breaking elongation is a measured extension value. The combined material, of which the ratio of breaking strength at a welding site to breaking strength of the base material is 65% or more, is called a more preferable combined material or a more excellent combined material.

Referring to Table 4, the C+D material, which is made by combining the C material formed by performing the T7 (2) heat treatment on the aluminum alloy and the D material formed by performing the T6 heat treatment on the aluminum forging alloy 6082 MF, was measured to have a greater ratio of breaking strength to breaking strength of the base material and greater breaking elongation than the D+D material.

The material, which is formed by performing the heat treatment on the present aluminum alloy, and the A+A material and the B+C material, which are formed by combining the materials, have good breaking strength at the welding site which is improved by 65% or more than breaking strength of the base material. Meanwhile, even though the heat treatment condition varies, the breaking strength at the welding site of the B and C materials, on which the T7 heat treatment is performed, and the B+C material, which is made by combining the B and C materials, is subjected to the T6 heat treatment. However, it can be seen that the B+C material has a relatively better ratio of breaking strength to breaking strength of the base material than the A+A material.

Meanwhile, since the present aluminum alloy includes silicon (Si) of 10.5 to 13.5 wt %, the present aluminum alloy may be easily welded by laser welding. The great reason, among the reasons that make it difficult to weld the aluminum alloy, is the hot crack occurring at the welding site. In the case of so-called 6000 series alloys which are most widely used as aluminum forging alloys, a filler material needs to be necessarily used to prevent the hot crack during welding.

Figure 6A:
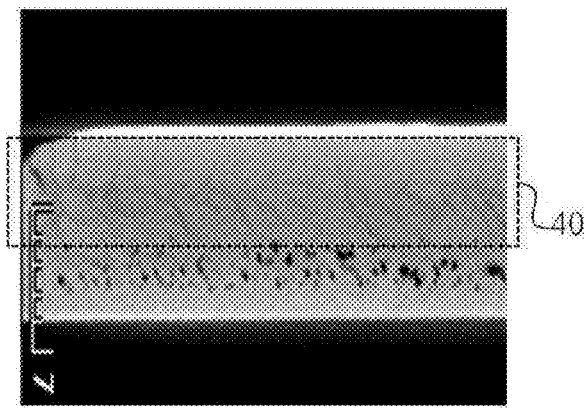
FIGS. 6A and 6B are X-ray photographs of a laser welding surface and a welding site of a D+D material and illustrate an optical microscope (OM) picture of a cross section of a bead captured when no filler material is used during welding.
Figure 6B:
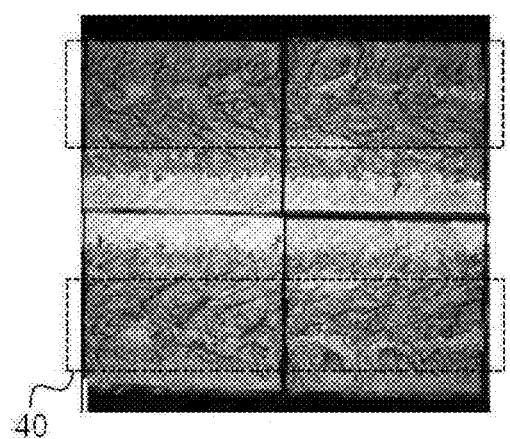
Figure 7A:
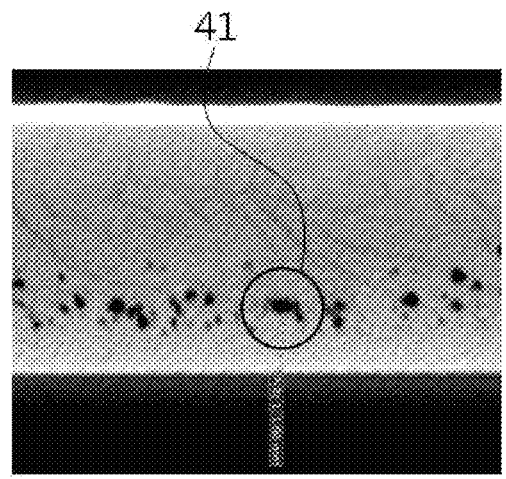
FIGS. 7A, 7C, and 7D are OM photographs of cross sections of beads made of the D+D material in FIGS. 6A and 6B.
Figure 7B:
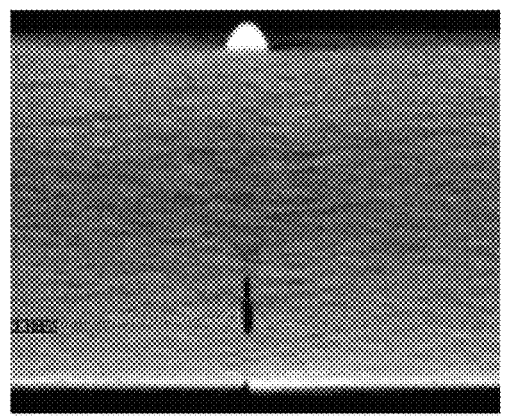
FIG. 7B is a CT photograph.
Figure 7C:
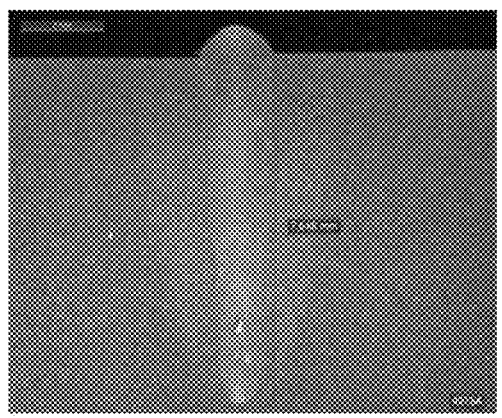
Figure 7D:
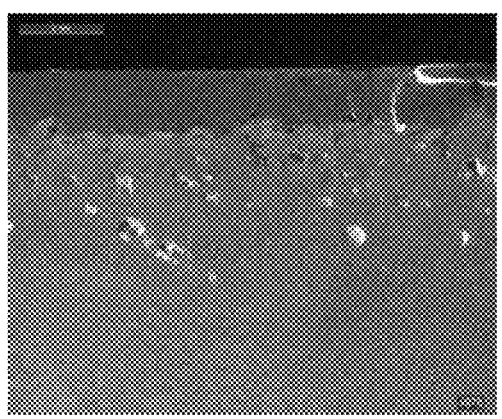

FIGS. 6A and 6B are X-ray photographs of a laser welding surface and a welding site of the D+D material and illustrate an optical microscope (OM) picture of a cross section of a bead captured when no filler material is used during welding. FIGS. 7A, 7C, and 7D are OM photographs of cross sections of beads made of the D+D material in FIGS. 6A and 6B, and FIG. 7B is a CT photograph. Referring to FIGS. 6A to 7D, it can be seen that a hot crack 40 occurred in a cross section of a bead when no filler material was used during welding. Further, a depth of weld penetration was 70 to 80% of an overall depth of 9 mm, and multiple bubble defects of 0.5 to 1.7 mm, particularly, bubble defects 41 of 1.66 mm were found at a depth which is 50 to 80% of the overall depth.

Figure 8A:
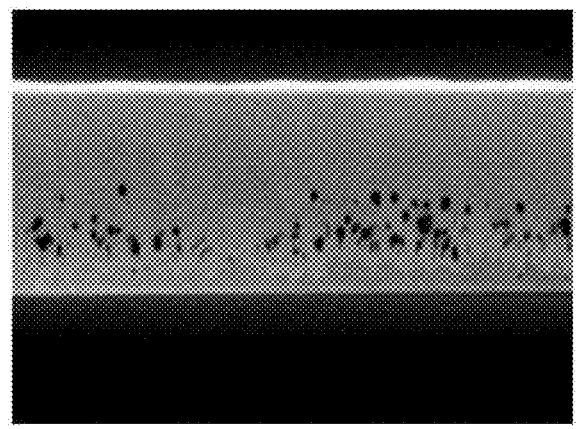
FIGS. 8A and 8B are X-ray photographs of a laser welding surface and a welding site of a C+D material and illustrate an OM picture of a cross section of a bead captured when no filler material is used during welding.
Figure 8B:
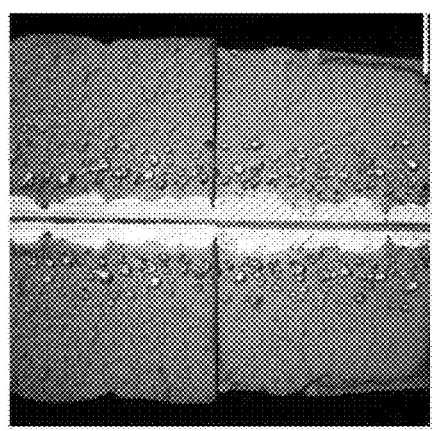
Figure 9A:
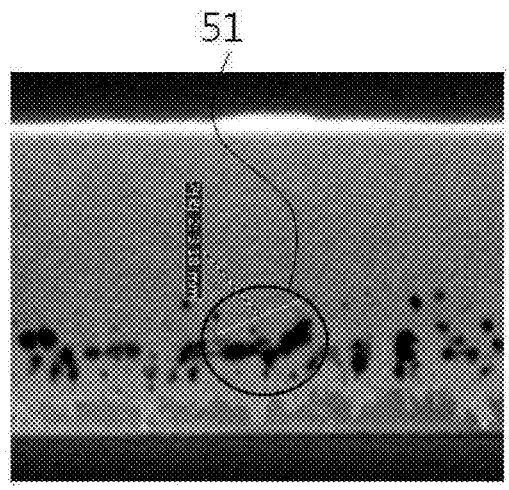
FIGS. 9A, 9C, and 9D are OM photographs of cross sections of beads made of the C+D material in FIGS. 8A and 8B.
Figure 9B:
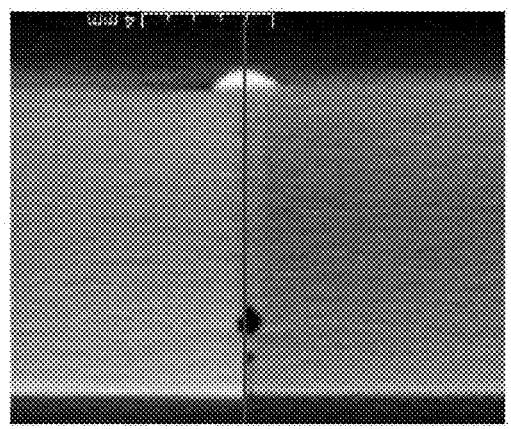
FIG. 9B is a CT photograph.
Figure 9C:
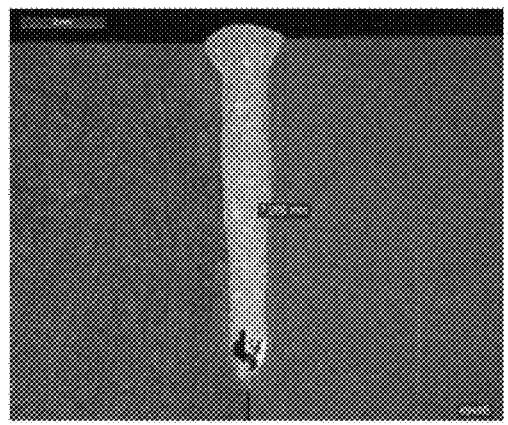
Figure 9D:
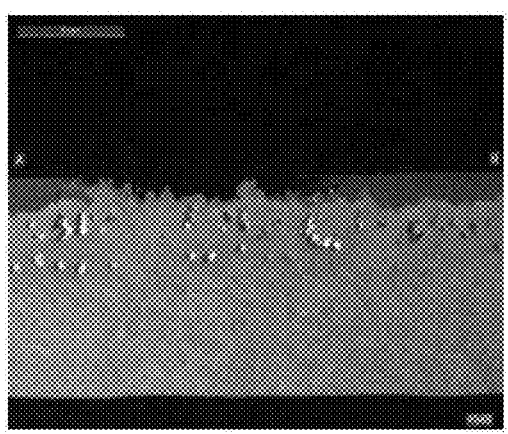

FIGS. 8A and 8B are X-ray photographs of a laser welding surface and a welding site of the C+D material and illustrate an OM picture of a cross section of a bead captured when no filler material is used during welding. FIGS. 9A, 9C, and 9D are OM photographs of cross sections of beads made of the C+D material in FIGS. 8A and 8B, and FIG. 9B is a CT photograph. Referring to FIGS. 8A to 9B, it can be seen that no hot crack occurred in a cross section of a bead even though no filler material was used during welding.

Further, a depth of weld penetration was 70 to 80% of the overall depth of 9 mm, and multiple bubbles of 0.5 to 1.7 mm, particularly, bubble defects 51 of 2.3 mm were found at a depth which is 50 to 80% of the overall depth.

Figure 10A:
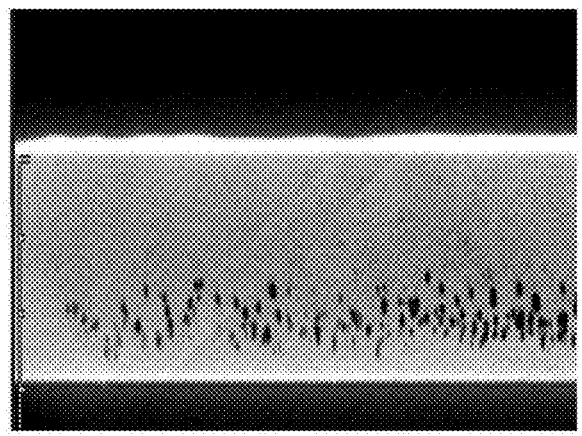
FIGS. 10A and 10B are X-ray photographs of a laser welding surface and a welding site of a B+C material and illustrate an optical microscope (OM) picture of a cross section of a bead captured when no filler material is used during welding.
Figure 10B:
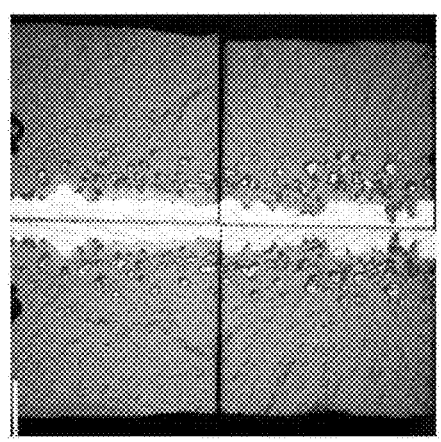
Figure 11A:
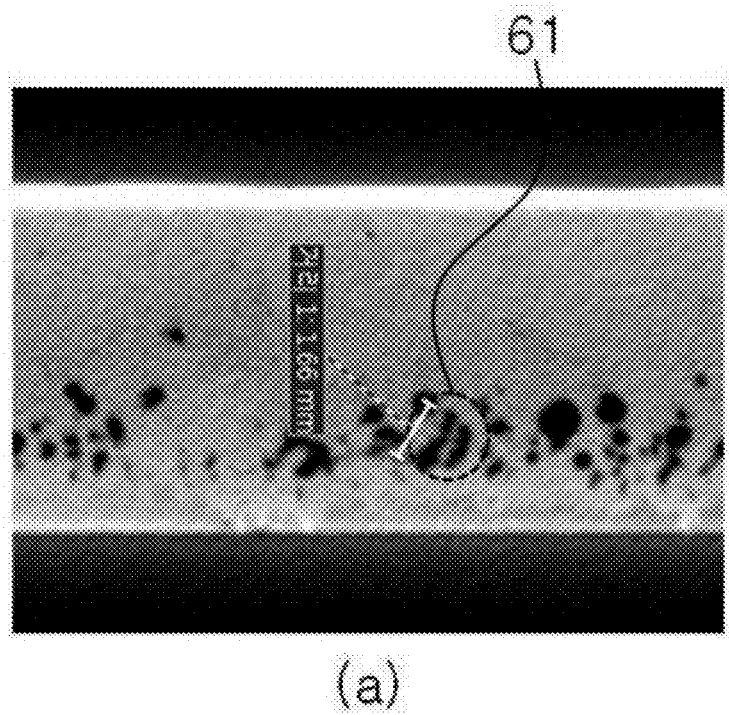
FIGS. 11A, 11C, and 11D are OM photographs of cross sections of beads made of the B+C material in FIGS. 10A and 10B.
Figure 11B:
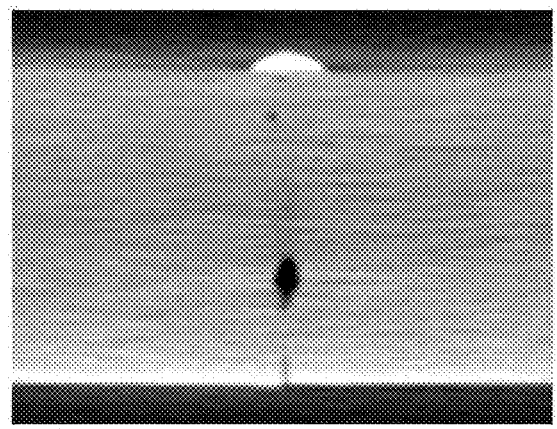
FIG. 11B is a CT photograph.
Figure 11C:
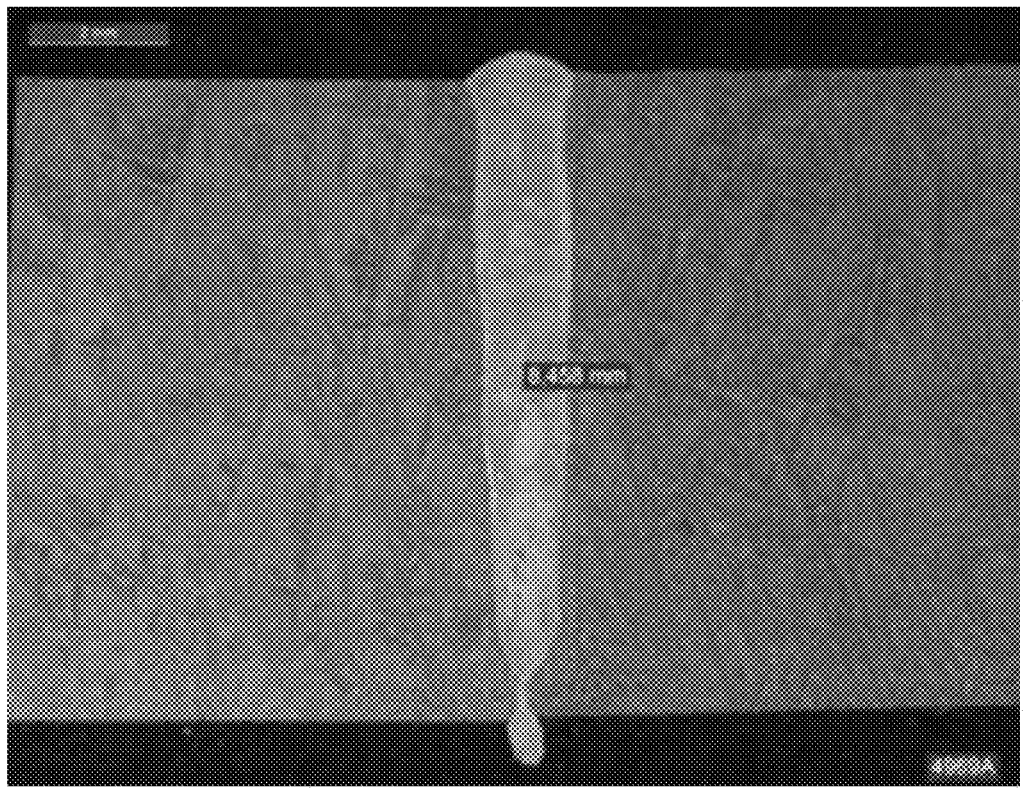
Figure 11D:
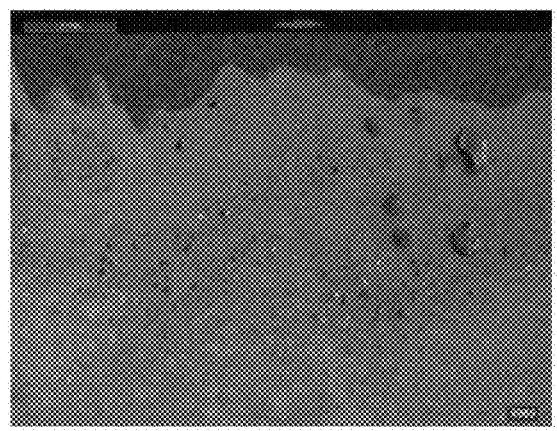

FIGS. 10A and 10B are X-ray photographs of a laser welding surface and a welding site of the B+C material and illustrate an optical microscope (OM) picture of a cross section of a bead captured when no filler material is used during welding. FIGS. 11A, 11C, and 11D are OM photographs of cross sections of beads made of the B+C material in FIGS. 10A and 10B, and FIG. 11B is a CT photograph. Referring to FIGS. 10A to 11D, it can be seen that no hot crack occurred in a cross section of a bead even though no filler material was used during welding. Further, a depth of weld penetration was 80 to 90% of the overall depth of 9 mm, such that the depth of weld penetration was comparatively uniform. Meanwhile, a back bead was observed at a start point of welding, bubbles were observed over the entire range of welding, and a size of a maximum bubble defect 61 was 1.7 mm.

In a case in which the filler material is used during welding, a bead width is inevitably increased by two to three times, which causes a disadvantage in layout of the carrier and causes losses due to additional equipment associated with the filler material and an increase in cycle time. Therefore, it can be said that the method according to the present disclosure is advantageous in welding aluminum.

Figure 12A:
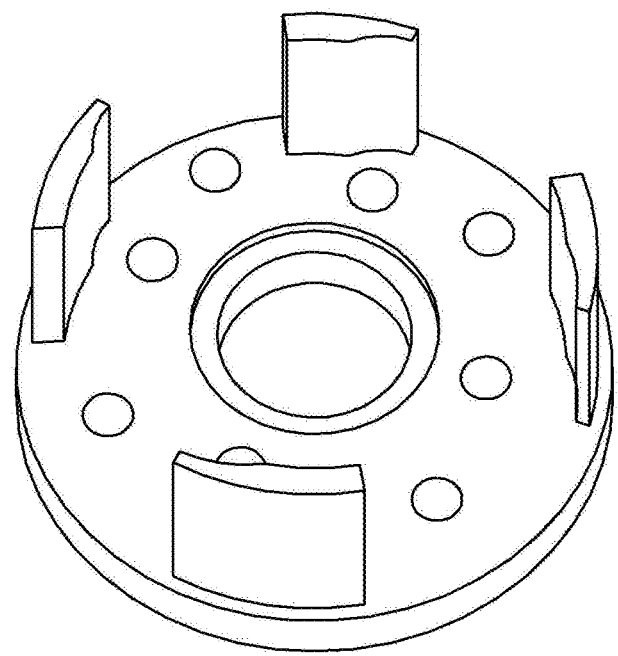
FIGS. 12A and 12B are photographs of the carrier plate and the base plate on which hot forging, heat treatment and processing are completely performed according to the exemplary embodiment of the present disclosure.
Figure 12B:
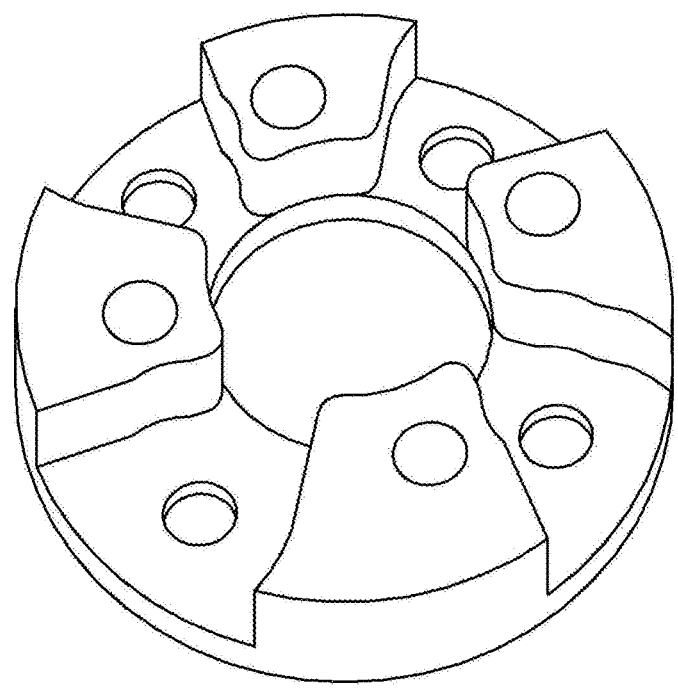
Figure 12C:
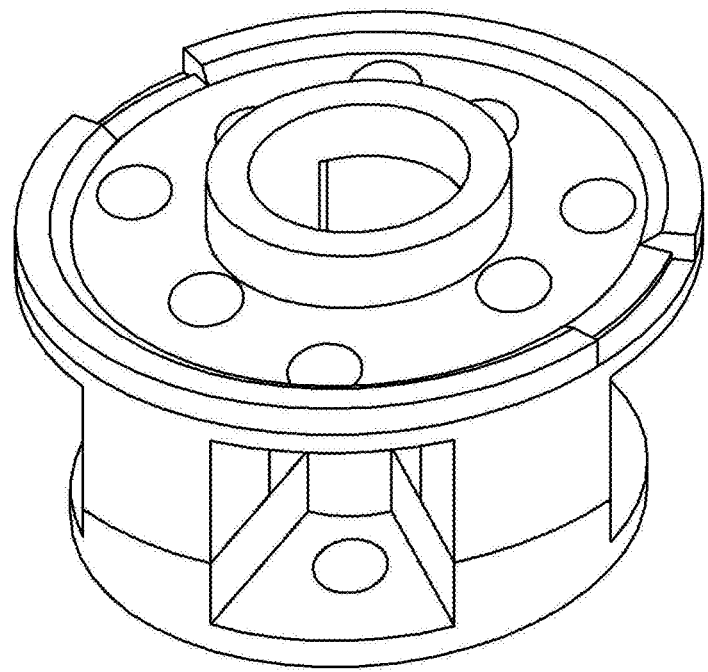
FIG. 12C is a photograph of the carrier made by completely welding the plates in FIGS. 12A and 12B.
Figure 12D:
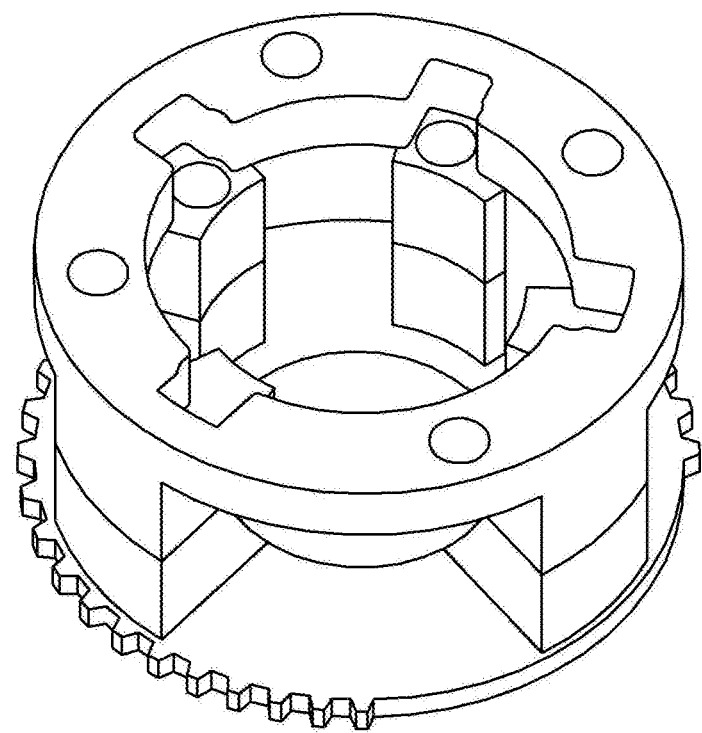
FIG. 12D is a photograph of a completely assembled product made by assembling all gear sets such as a sun gear required to assemble the double carrier.

FIGS. 12A and 12B are photographs of the carrier plate and the base plate on which hot forging, heat treatment and processing are completely performed according to the exemplary embodiment of the present disclosure, FIG. 12C is a photograph of the carrier made by completely welding the plates in FIGS. 12A and 12B, and FIG. 12D is a photograph of a completely assembled product made by assembling all gear sets such as a sun gear required to assemble the double carrier.

A more detailed manufacturing method is as follows. A material was made by upsetting a billet material and performing two-stage hot forging and trimming, turning machining was performed on the material, and hot forging was performed on the material having a large amount of silicon (Si). Therefore, the upsetting was performed on the material at an annealing temperature increased by 20 degrees more than an annealing temperature of a general material and then the hot forging was performed. Therefore, the T7 heat treatment was performed. A dual focused method was applied as laser welding under an atmospheric pressure condition. The welding conditions are shown in the following Table 5. When an overall depth was 10 mm, a welding depth was 8 mm, and a welding width was 2 mm.

TABLE 5

| Process Gas | Gas Pressure | Magnification | Speed | Focus Level | Fcoll | Focus | Pow. lev. Center | Pow. lev. Ring |
|---|---|---|---|---|---|---|---|---|
| N$_2$ | 30.0 1/min | 1.25 | 130.00 | −2.00 | 200 | 250 | 4,000 W | 4,000 W |

Figure 13A:
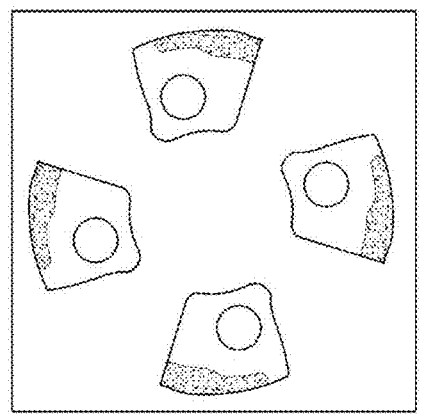
Figure 13B:
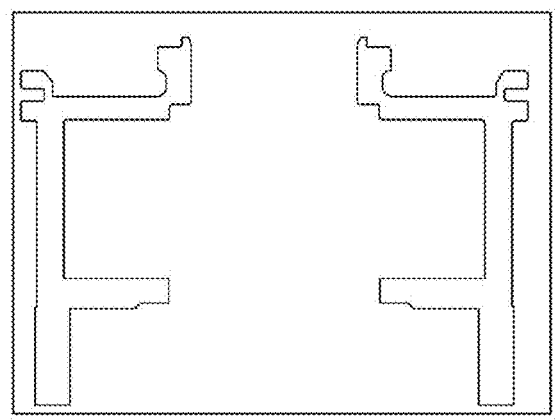

FIGS. 13A and 13B are CT photographs of a bubble defect at a welding site, in which FIG. 13B is a CT photograph of a side cross section of the carrier. Referring to FIGS. 13A and 13B, it can be seen that a size of a bubble defect is 1 mm or less, and a defect area is 10% or less of a welding site.

TABLE 6

| Material | | Torsional Strength | Evaluation of Torsional Durability |
|---|---|---|---|
| Base Plate | Carrier Plate | Measured Value (kgf-m) | (CYCLE) |
| A | A | 177.1 to 238.1 | 468,211 |
| C | C | 209.9 to 238.9 | 500,000 |
| D | C | 221.5 to 260.6 | 500,000 |

Table 6 shows a result of evaluating strength and durability after assembling a completely assembled product as illustrated in FIG. 12D while varying materials of the base plate and the carrier plate. In this evaluation, a rotational speed and torque, which are imparted to an actual carrier, are equally imparted to the completely assembled product, such that an evaluation condition is set to be maximally similar to an actual use condition. The A to D materials shown in Table 6 have been described above.

Referring to Table 6, it can be seen that five hundred thousand cycles can be achieved during the evaluation of torsional durability when both of the base plate and the carrier plate are made of the C material or only the carrier plate is made of the C material.

Hereinafter, a double layer carrier manufactured by the method of manufacturing a double layer carrier according to the present disclosure will be described. However, the configuration of the double layer carrier will be briefly described because the configuration of the double layer carrier has been already described in detail above.

The double layer carrier includes the carrier plate, and the base plate which is welded on the carrier plate. The materials of the two plates are aluminum forging alloys. At least one of the two plates may include silicon (Si) of 10.5 to 13.5 wt %, and the plate including silicon (Si) of 10.5 to 13.5 wt % may include primary silicon and eutectic silicon and may further include copper (Cu) of 3.0 to 5.0 wt % and magnesium (Mg) of 0.2 to 1.0 wt %. In addition, the fatigue strength of the plate including silicon (Si) of 10.5 to 13.5 wt % may be 99 to 129 MPa, and the elongation of the plate may be 1.7 to 2.4%. The breaking strength of the connecting portion may be 65% or more of the breaking strength of the plate.

While the present disclosure has been described in detail above with reference to the representative exemplary embodiment, those skilled in the art to which the present disclosure pertains will understand that the exemplary embodiment may be variously modified without departing from the scope of the present disclosure. Accordingly, the scope of the present disclosure should not be limited to the described exemplary embodiment, but should be defined not only by the appended claims but also by all changes or modified forms induced from an equivalent concept to the claims.

The invention claimed is:

1. A method of manufacturing a double layer type transmission planetary gear carrier, the method comprising:

forming and processing a carrier plate and a base plate by performing hot forging on two aluminum alloys; and welding a connecting portion between the two plates;

wherein at least one of the two aluminum alloys includes silicon (Si) of 10.5 to 13.5 wt %.

2. The method of claim 1, wherein the connecting portion between the two plates is welded by laser welding.

3. The method of claim 1, wherein the aluminum alloy including silicon (Si) of 10.5 to 13.5 wt % further includes copper (Cu) of 3.0 to 5.0 wt % and magnesium (Mg) of 0.2 to 1.0 wt %.

4. The method of claim 1, further comprising:

performing a T7 heat treatment on the two plates before welding the two plates.

5. A double layer type transmission planetary gear carrier comprising:

a carrier plate; and a base plate which is welded on a connecting portion of the carrier plate, wherein materials of the two plates are aluminum forging alloys;

wherein at least one of the two aluminum alloys includes silicon (Si) of 10.5 to 13.5 wt %.

6. The double layer type transmission planetary gear carrier of claim 5, wherein the plate including silicon (Si) of 10.5 to 13.5 wt % includes primary silicon and eutectic silicon.

7. The double layer type transmission planetary gear carrier of claim 5, wherein the plate including silicon (Si) of 10.5 to 13.5 wt % further includes copper (Cu) of 3.0 to 5.0 wt % and magnesium (Mg) of 0.2 to 1.0 wt %.

8. The double layer type transmission planetary gear carrier of claim 7, wherein fatigue strength of the plate is 99 MPa or more.

9. The double layer type transmission planetary gear carrier of claim 7, wherein elongation of the plate is 1.7% or more.

10. The double layer type transmission planetary gear carrier of claim 7, wherein breaking strength of the connecting portion is 65% or more of breaking strength of the plate.

* * * * *